United States Patent
Ahlbäck et al.

(10) Patent No.: US 8,879,525 B2
(45) Date of Patent: Nov. 4, 2014

(54) METHOD AND ARRANGEMENTS FOR ENHANCED WIRELESS ACCESS SIGNALLING IN A WIRELESS LOCAL AREA NETWORK

(75) Inventors: Hans Ahlbäck, Åbo (FI); Harri Hakala, Turku (FI)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 621 days.

(21) Appl. No.: 13/139,488

(22) PCT Filed: Jan. 13, 2009

(86) PCT No.: PCT/SE2009/050017
§ 371 (c)(1),
(2), (4) Date: Jun. 13, 2011

(87) PCT Pub. No.: WO2008/134281
PCT Pub. Date: Nov. 6, 2008

(65) Prior Publication Data
US 2011/0243114 A1    Oct. 6, 2011

(51) Int. Cl.
| H04W 4/00 | (2009.01) |
| H04W 48/14 | (2009.01) |
| H04W 48/10 | (2009.01) |
| H04W 48/16 | (2009.01) |
| H04W 8/18 | (2009.01) |
| H04W 48/12 | (2009.01) |

(52) U.S. Cl.
CPC ............ *H04W 48/14* (2013.01); *H04W 48/10* (2013.01); *H04W 48/16* (2013.01); *H04W 8/18* (2013.01); *H04W 48/12* (2013.01)
USPC ............................ 370/338; 455/437; 709/225

(58) Field of Classification Search
None
See application file for complete search history.

(56) References Cited

U.S. PATENT DOCUMENTS

2006/0268802 A1* 11/2006 Faccin ............... 370/338
2009/0279492 A1* 11/2009 Montemurro et al. ....... 370/329

FOREIGN PATENT DOCUMENTS

| EP | 1 947 889 A2 | 7/2008 |
| WO | WO 2005/076639 A1 | 8/2005 |

(Continued)

OTHER PUBLICATIONS

International Search Report, PCT Application No. PCT/SE2009/050017, Nov. 3, 2009.

(Continued)

*Primary Examiner* — Khoa Huynh
(74) *Attorney, Agent, or Firm* — Myers Bigel Sibley & Sajovec, P.A.

(57) ABSTRACT

A method and a wireless transmit/receive unit (WTRU) (600), including a universal subscriber identity module USIM (625), for identifying a closed subscriber group (CSG) cell are disclosed. The WTRU (600) receives a broadcast from a cell including a cell identifier (ID). If the cell ID is associated with a CSG cell, the WTRU (600) determines whether the CSG ID is programmed in the USIM (625). The cell broadcast may include a single bit information element (IE) indicating that the cell is a CSG cell. If the cell ID is a CSG ID, the cell ID may further include a plurality of fields which indicate at least one of a country, a region, an operator, and a home evolved Node-B (HeNB) number. The cell broadcast may further include a bit indicating whether the CSG cell is public or private. The cell broadcast may further include a bit indicating that emergency calls are allowed from all users.

20 Claims, 3 Drawing Sheets

(56) References Cited

FOREIGN PATENT DOCUMENTS

| WO | WO 2008/008987 A2 | 1/2008 |
| WO | WO 2008/008987 A3 | 1/2008 |
| WO | WO 2008008987 A2 * | 1/2008 |
| WO | WO 2008/134281 A2 | 11/2008 |
| WO | WO 2008/134281 A3 | 11/2008 |
| WO | WO 2008134281 A2 * | 11/2008 |

OTHER PUBLICATIONS

Written Opinion of the International Searching Authority, PCT Application No. PCT/SE2009/050017, Nov. 3, 2009.
International Preliminary Report on Patentability, PCT/SE2009/050017, Apr. 14, 2011.

* cited by examiner

Fig. 1
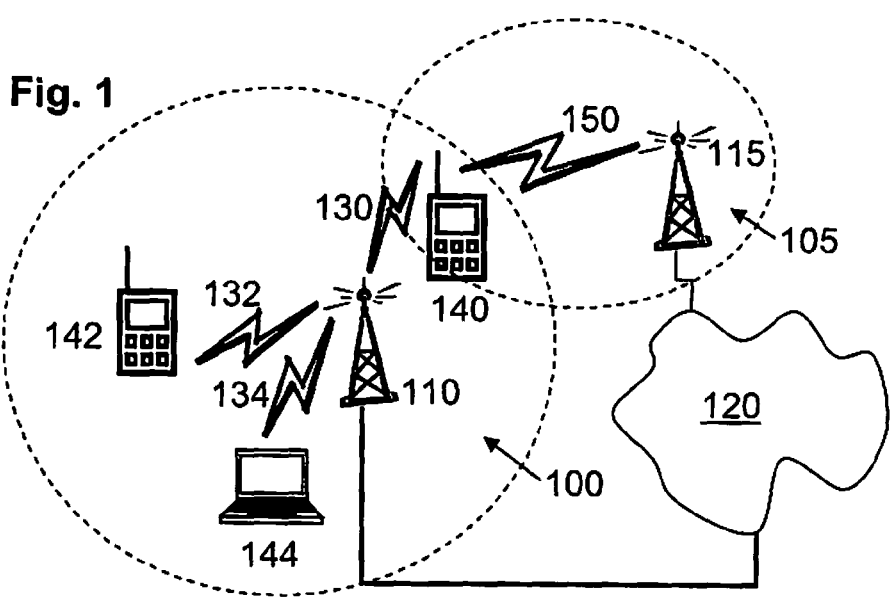
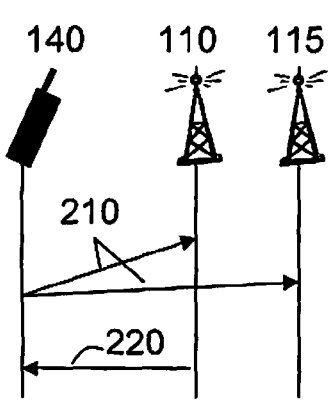
Fig. 2a
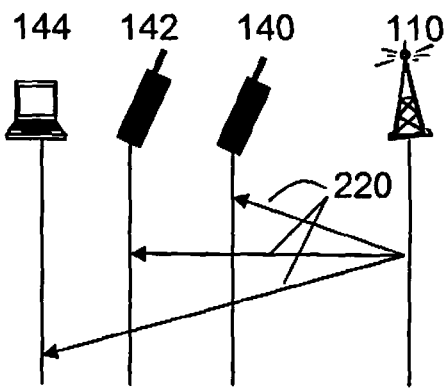
Fig. 2b
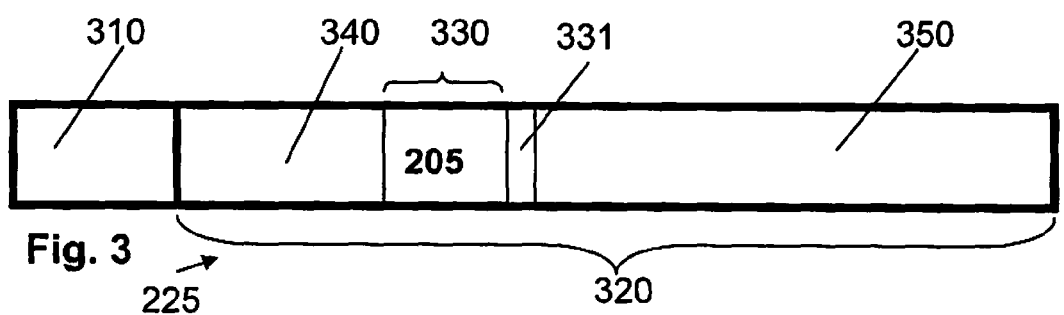
Fig. 3

METHOD AND ARRANGEMENTS FOR ENHANCED WIRELESS ACCESS SIGNALLING IN A WIRELESS LOCAL AREA NETWORK

CROSS REFERENCE TO RELATED APPLICATION

This application is a 35 U.S.C. §371 national stage application of PCT International Application No. PCT/SE2009/050017, filed on 13 Jan. 2009, the disclosure and content of which is incorporated by reference herein in its entirety. The above-referenced PCT International Application was published in the English language as International Publication No. WO 2010/082873 A1 on 22 Jul. 2010.

TECHNICAL FIELD

The present application relates to wireless networks. More particularly the present invention relates to a method for WLAN access signaling as well as an access point and a wireless endpoint device in a wireless network.

BACKGROUND

The use of wireless networks have become more common during the recent years due to several aspects such as e.g. an increased number of service providers, increasing transmission rates, decreasing usage costs and decreasing prices of the wireless equipment. Wireless networks enable access to computing resources for devices that are not physically connected to a network.

Examples of popular services provided through wireless networks are e.g. Internet access, multimedia services such as e.g. streaming of music and films, etc.

Wireless Local Area Network (WLAN) is a common technology for wireless network access which is specified in IEEE 802.11 standards. WLANs typically operate over a fairly limited range, such as an office building or a building block. The components of a WLAN are wireless user devices, a.k.a. stations (STA) and access points (AP). Examples of STAs are e.g. laptop computers, mobile phones, smart phones and Personal Digital Assistants (PDAs).

The APs are network nodes that allow the STAs to communicate wirelessly and to connect to another network, typically an organization's wired infrastructure or the Internet.

WLAN provides wireless network access, both for public and private purposes. Public network access is usually provided by hotels, airports, restaurants etc. for their customers. In some cases there may even be city-wide networks available for the public, free of charge. Private WLANs are normally not intended for public use, unless permission has been given by the network/access point owner. The private WLAN is usually only intended to be used by the members of the household where the private WLAN is located.

The most common methods of protecting a wireless network are by the use of authentication and or encryption. There are also other ways of protecting a WLAN by e.g. specifying the Media Access Control addresses of the STAs that are allowed to connect to the AP.

But many home users leave their private WLAN unprotected because it is more difficult to set up a protected WLAN, compared to setting up an unprotected WLAN. The WLAN network can usually be made operational just by connecting the electrical power to the equipment. The activation of protection however, requires configuration changes. A wireless connection without protection may be referred to as an open wireless connection. If a wireless network is left totally without protection, which is a very common case, it is very easy for an outsider to attach to the network without the owner of the access point being able to control it.

The common prior art methods of a STA connecting to a WLAN comprise displaying a list of active WLANs in the area, on the STA. Thereafter the user of the STA selects which WLAN to connect to, where after the WLAN attach is performed, by the WLAN access functionality of the STA, to the WLAN chosen by the user.

However, in some cases depending on the settings in the STA, the connecting to a WLAN may be performed automatically. The WLAN attach procedure may furthermore be executed in the background of the STA, without the user noticing or even knowing it.

A major problem associated with the present WLAN access process is that the use of an open WLAN connection without authorization may be regarded as a crime. In some countries it is no longer permitted to attach to, and hence also use, a WLAN network intended for private use, unless permission has been granted by the owner. It has been stated that the use of an open WLAN connection without authorization may be regarded as "unauthorized use" and one accused was sentenced to a six day fine.

In WLAN there is no way for the AP to inform to STAs whether the network is intended for private or public use. This means that a private unprotected WLAN may be unintentionally connected to without permission, since the user has no information about whether the WLAN available for access is intended for private use or public use. Furthermore, with the present WLAN access procedure the only way for a user of a STA to be granted/get permission from the network owner, i.e. the owner of the access point, to access an open wireless connection is to agree with the owner of AP that he/she is allowed to use the wireless network. At present there isn't any technical method or protocol mechanism to control this permission in case of an unprotected WLAN.

Having the recent Finnish court decisions in mind the user of a STA at present thus risks disobeying the law as soon as a wireless connection is established! This may lead to a decreased usage of the WLAN technology due to the users' fear of and unwillingness to commit a crime.

SUMMARY

The present invention aims at obviating or reducing at least some of the above mentioned disadvantages associated with existing technology.

It is an object of the present invention to provide a mechanism for improved access signaling in a wireless local area network.

The basic principle of solving the problem in for the access point of the wireless local area network to provide information regarding if the wireless network is intended for public use or private use to wireless endpoint devices within coverage of the wireless local area network.

According to a first aspect of the present invention, the object is achieved by a method in an access point for providing network access information to a wireless endpoint device. The wireless endpoint device is located within the coverage of a wireless local area network. The wireless local area network comprises the access point. The method is characterized by the step of sending an information message to the wireless endpoint device. The information message comprises an access point information. The access point information indicates whether the wireless local area network is intended for public use or private use.

According to a second aspect of the present invention, the object is achieved by an access point capable of providing network access information to a wireless endpoint device. The wireless endpoint device is located within the coverage of a wireless local area network. The wireless local area network comprises the access point. The access point comprises a sending unit adapted to send an information message to the wireless endpoint device. The information message comprises an access point information indicating whether the wireless local area network is intended for public use or private use.

According to a third aspect of the present invention, the object is achieved by a method in a wireless endpoint device for being provided with network access information. The wireless endpoint device is located within coverage of one or more wireless local area networks. The one or more wireless local area networks comprise a respective access point. The method is characterized by the step of receiving one or more information messages from the respective one or more access points. The information messages each comprising an access point information. The access point information indicates whether the respective wireless local area network is intended for public use or private use.

According to a fourth aspect of the present invention, the object is achieved by a wireless endpoint device. The wireless endpoint device is located within coverage of one or more wireless local area networks. The one or more wireless local area networks comprise a respective access point. The wireless endpoint device comprises a receiving unit adapted to receive one or more information messages from the respective one or more access points. The information messages each comprise an access point information. The access point information indicates whether the respective wireless local area network is intended for public use or private use.

Since the access point of the wireless local area network provides information of the intended use of the wireless network to the wireless endpoint devices within coverage of the wireless local area network, by indicating whether the wireless local area network is intended for public use or private use, the risk of unintentionally unauthorized access is decreased.

An advantage of the present solution is that the risk of connecting to a network intended for private use by mistake is minimized. Since this in some jurisdictions may be considered a crime the present solution is most favorable and useable.

BRIEF DESCRIPTION OF THE DRAWINGS

FIG. 1 is a block diagram illustrating an embodiment of a wireless network.

FIGS. 2a, 2b are combined signaling diagrams and block diagrams according to some embodiments.

FIG. 3 is a block diagram illustrating an embodiment of a message frame

DETAILED DESCRIPTION

Figure 5:
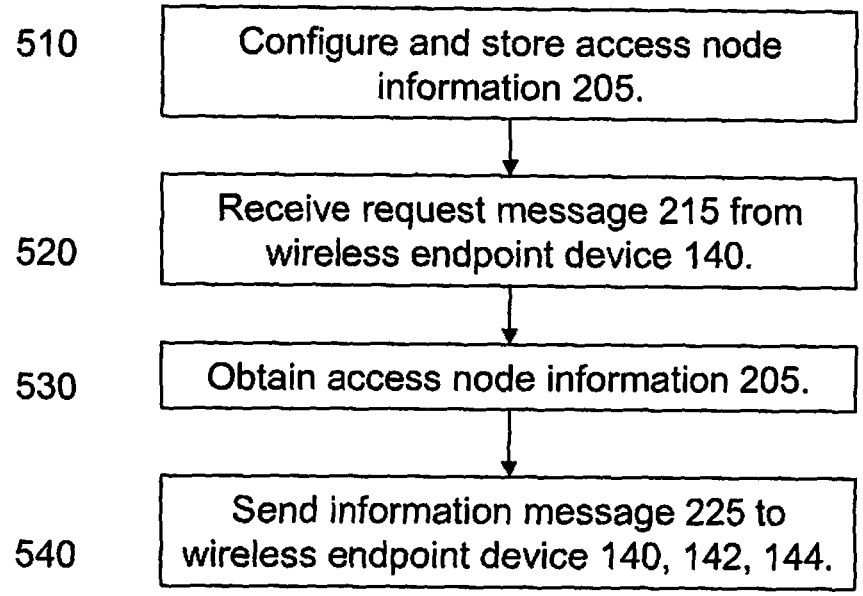
FIGS. 4 and 5 are flow charts illustrating embodiments of method steps.

The present solution regards the wireless network access process in a wireless network as presented below. To overcome the obstacles stated in the background section this invention presents an enhanced wireless network access procedure.

FIG. 1 depicts a wireless network 100 according to some embodiments of the invention. The wireless network 100 includes an access node 110, from now on referred to as an access point. The access point 110 is connected to a network 120, such as e.g. a company LAN, a service provider's access network or the Internet. The access point 110 is a wireless entity which provides access to the services of the distribution network, via a wireless connection.

Further the wireless network 100 may comprise at least one wireless endpoint device, such as e.g. a laptop computer, a mobile phone, a smart phone, a Personal Digital Assistants (PDA). FIG. 1 shows a first wireless endpoint device 140, which may be connected to the access point 110 via the wireless connection 130, and a second wireless endpoint device 142, which may be connected to the access point 110 via the wireless connection 132 and a third wireless endpoint device 144, which may be connected to the access point 110 via the wireless connection 134.

According to some embodiments depicted in FIG. 1 the wireless endpoint device 140 may be within coverage of a second wireless network 105. Wireless network 105 may include an access point 115. The access point 115 may be connected to a distribution network, such as e.g. network 120. The access point 115 may be a wireless entity which provides access to the services of the distribution network, via a wireless connection. The wireless endpoint device 140 may be connected to the access point 115 via the wireless connection 150.

The wireless network 100, 105 may be any wireless network not strictly based on subscriptions. The wireless network 100, 105 may be a WLAN, the access point 110, 115 may be a WLAN access point and the wireless endpoint devices 140, 142, 144 may be WLAN stations.

According to some embodiments the wireless network 100, 105 may be a WiMAX network, the access point 110, 115 may be a WiMAX access point and the wireless endpoint devices 140, 142, 144 may be WiMAX mobile stations.

The purpose of the present solution is to enable the wireless endpoint device 140, 142, 144 to get information regarding if the wireless networks 100, 105 are intended for public use or private use.

The present solution ensures that the wireless network 100, 105 being utilized can provide information about the intended purpose and decreases the risk of unintentionally unauthorized access. This is highly advantageous as the solution will minimize the risk for the user of the wireless endpoint devices 140, 142, 144 to connect to a network intended for private use by mistake as the intended usage of the network should be clearly visible to the user. Since this in some jurisdictions may be considered a crime the present solution is most favourable and useable.

The providing of the public/private information to the wireless endpoint devices 140, 142, 144 according to the present solution may be put into practice by the adding of a new parameter to the existing wireless network access signaling. The new parameter is used to indicate whether the wireless network 100, 105 is intended for public use or private use.

According to some embodiments the public/private information may be included in the messages of the wireless network access signaling where the access points 110, 115 distribute information about their capabilities. Examples of such messages are e.g. 802.11/WLAN Beacon frame and 802.11/WLAN Probe Response frame. By adding the public/ private information to these messages it could be ensured that the wireless endpoint devices 140, 142, 144 always have access to this information.

The "public"-indication is used to indicate that the wireless network is available for public use. This would be the setting used for hotels, airports etc. This would also be used by wireless networks that are based on private access points sharing their access to other members of the network, such as e.g. the Wippies and OpenSpark networks in Finland. Even if the wireless network 100, 105 is public, the access to the network 100, 105 may still be controlled via access credentials only provided to intended users. Examples of such access credentials are e.g. user names and passwords.

The "private"-indication is used to indicate that the wireless network 100, 105 is intended for private use. This is the case regardless whether the wireless network 100, 105 is encrypted or not.

The default setting of the public/private information would preferably be "private" to facilitate the set up of private wireless networks. This ensures that the owner of the access point 110 of the wireless network 100, 105 has to separately switch on the indicator in order to make the wireless network 100, 105 public and thereby share it.

The said new public/private information may be set as a parameter in the access point 110, 115 by the owner of the wireless network 100, 105 provided by the access point 110, 115. The public/private information may be stored in the access point 110, 115. The public/private parameter may be changed at any time by the administrator and/or owner of the access point 110, 115 of the wireless network 100, 100, just as other network configuration data. The setting of the parameter would preferably be handled via ordinary wireless access point software, just as any other access point specific parameter is specified today when using wireless local area networks.

FIGS. 2a and 2b are signaling schemes illustrating embodiments of the present solution wherein enhanced wireless network access signaling in the wireless network 100 is performed. According to the present solution the said new parameter is transmitted by the access point 110 to the wireless endpoint devices 140, 142, 144 within the coverage of the wireless network 100.

When connecting to the wireless network 100, such as e.g. a WLAN, access point information 205 needs to be available to the wireless endpoint device 140 desiring to connect to the wireless network 100. The access point information 205 is described in detail further on and is depicted in FIG. 3. Such access point information 205 may be e.g. the name of the wireless network 100. The network name may be represented by a SSID, Service Set Identifier (SSID). The SSID allows the wireless endpoint devices 140, 142, 144 to distinguish one wireless network from another, such as e.g. to distinguish wireless network 100 from wireless network 105.

According to some embodiments depicted in FIG. 2a the wireless network access signaling may be initiated by the wireless endpoint device 140 by broadcasting 210 a request message 215 to all access points within the broadcast area. The request message 215 is not depicted any Figure. According to the example of FIG. 2a the request message 215 is broadcasted to access point 110 of wireless network 100 and to access point 115 of wireless network 105. The request message 215 may comprise a request for wireless network information. According to some embodiments the request message 215 may be an 802.11 WLAN Probe Request frame.

From now on the present solution is described as performed by the access point 110. Access point 115 may also be capable of performing all the method steps described below, but to avoid confusion this description focuses on access point 110.

The access point 110 may receive the request message 215 from the wireless endpoint device 140. The access point 110 may obtain the previously stored access point information 205.

According to common access signaling the access point 110 may perform some kind of resource check to validate that enough resources are available to enable the requesting wireless endpoint device wireless access. Further according to common access signaling resource reservation may be performed when the resource check was successful.

Thereafter the access point 110 sends 220 an information message 225 to the wireless endpoint device 140. The information message 225 is depicted in FIG. 3 and is described in detail below.

The purpose of the information message 225 is to provide technical information about the access point 110 and wireless network 100 to wireless endpoint devices within coverage of the wireless network 100 such as e.g. wireless endpoint devices 140, 142, 144, enabling the wireless endpoint devices 140, 142, 144 to communicate with the access point 110. The information message 225 comprises the access point information 205. The access point information 205 indicates whether the wireless network 100 is intended for private use or public use. The information message 225 may be sent from the access point 110 as a response to the previously received request message 215. According to some embodiments the information message 225 may be an 802.11 WLAN Probe Response frame.

According to other embodiments depicted in FIG. 2b the wireless network access signaling may be initiated by the access point 110 by obtaining such previously stored access point information 205 as described above. Thereafter the access point 110 sends 220 the information message 225 to the wireless endpoint devices 140, 142, 144 located within the coverage of the wireless network 100. As mentioned above, the information message 225 is depicted in FIG. 3 and is described in detail below.

According to some embodiments the information message 225 may be broadcasted from the access point 110 to the wireless endpoint devices 140, 142 and 144 located within the coverage of the wireless network 100. The wireless endpoint devices 140, 142, 144 may be listening to the broadcast. The information message 225 may be an 802.11 WLAN Beacon frame.

This section describes the steps that may be executed/performed in the wireless endpoint device 140, 142, 144 when the previously described information message 225 is received: The wireless endpoint devices 140, 142, 144 may receive the information message 225 from the access point 110. The wireless endpoint devices 140, 142, 144 may comprise an application handling the wireless connections, such as e.g. a "network monitor".

From now on this description of the present solution will focus only on the wireless endpoint device 140. However the scenario described below may be performed in any of the wireless endpoint devices 140, 142, 144 located within the coverage of the wireless network 100.

When having received the information message 225 the network monitor of the wireless endpoint device 140 may display the received access point information 205 of the received information message 225 on the display of the wireless endpoint device 140. As depicted in FIG. 1 the wireless endpoint device 140 may be within the coverage of several wireless networks, such as wireless network 100 and wireless network 105. According to some embodiments the wireless endpoint device 140 may receive an information messages 225 from the access points 110, 115 of each wireless network 100, 105. With such access point information 205 available in the network monitor, the user of the wireless endpoint device 140 may easily see which wireless networks are available for public use and which are only intended for private purposes.

Based on the access point information 205, of the information message 210, a selection of which wireless network to attach to, may be performed. According to some embodiments the user of the wireless endpoint device 140 selects which wireless network to connect to by interacting with the connection handling application such as e.g. the network monitor. According to other embodiments depending on the settings in the wireless endpoint device 140, the wireless endpoint device 140 automatically selects a wireless network to connect to. Thus, in some cases, the connecting to the wireless network 100 may be performed without input from the user of the wireless endpoint device 140. According to some embodiments the network monitor application or operating system of the wireless endpoint device 140 may display a warning text and may potentially temporarily interrupt the access procedure if the wireless endpoint device 140 tries to connect to a wireless network intended for private use.

FIG. 3 shows an embodiment of an information message 225. The information message 225 comprises a message header 310 and a message body 320. The message body 320 may comprise several elements 330, 340, 350 comprising e.g. radio capabilities information of the wireless network 100. The information message 225 comprises the access point information 205 indicating whether the wireless network 100 is intended for public use or private use. The information message 225 may also include common access point capabilities information. According to some embodiments the message body element 330 may be used for the access point information 205 of the present solution. According to some embodiments the access point information 205 may be e.g. represented by an extra field 331 in the frame body 320.

Further the access point information 205 indicating whether the wireless network 100 is intended for public use or private use may be represented by a "public"-indication and a "private"-indication. The "public"-indication and the "private"-indication may be used as exclusively alternatives, that is to say only one indication at a time is used.

The information message 225 may be an access point capabilities message used in the 802.11 WLAN access signaling. As mentioned above, the information message 225 may be a Beacon frame or a Probe Response frame.

Figure 4:
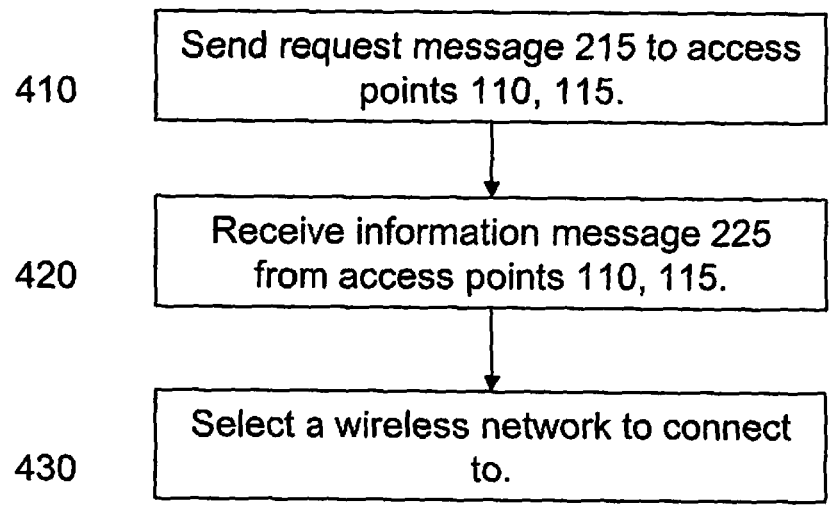

The present invention will now be described in detail with reference to FIG. 4. FIG. 4 presents the steps of a method in a wireless endpoint device 140, 142, 144. It is a method for being provided with network access information. The wireless endpoint device 140, 142, 144 is located within coverage of one or more wireless local area networks 100, 105. The one or more wireless local area networks 100, 105 comprise a respective access point 110, 115. The method comprises the following steps:

410. This is an optional step. The wireless endpoint device 140, 142, 144 sends 210 a request message 215 to each of the one or more access points 110, 115. Each of said request messages 215 comprise a request for wireless network information. This step is to be taken prior to the receiving step 420.

420. In this step the wireless endpoint device 140, 142, 144 receives one or more information messages 225 from the respective one or more access points 110, 115. The information messages 225 each comprise an access point information 205. The access point information 205 indicates whether the respective wireless local area network 100, 105 is intended for public use or private use.

430. This is an optional step to be taken after the receiving step 420. The wireless endpoint device 140, 142, 144 selects one or none of the one or more wireless local area networks 100, 105 to connect to based on the received access point information 205.

The present invention will now be described in detail with reference to FIG. 5. FIG. 5 presents the steps of a method performed by an access point 110. It is a method for providing network access information to a wireless endpoint device 140, 142, 144. The wireless endpoint device 140, 142, 144 is located within the coverage of a wireless local area network 100. The wireless local area network 100 comprises the access point 110. The method comprises the following steps:

510. This is an optional step. The access point 110 configures and stores the access point information 205 in a capabilities unit 720. The capabilities unit 720 may be comprised in the electronic device 100.

520. This is an optional method step to be taken prior to the sending step 220, 540. The access point 110 receives a request message 215 from the wireless endpoint device 140, 142, 144. The request message 215 may comprise a request for wireless network information. The request message 215 may be represented by a Probe Request frame.

530. This is also an optional step. Thereafter the access point 110 may obtain said stored access point information 205 from the capabilities unit 720. This step may be performed prior to the sending step 220, 540 wherein the information message 225 is sent.

540. The access point 110 sends 220 an information message 225 to the wireless endpoint device 140,142, 144. The information message 225 comprises an access point information 205 indicating whether the wireless local area network 100 is intended for public use or private use. The access point information 205 may be included in the frame body 320 of the information message 225. The access point information 205 may be represented by an extra field 331 in the frame body 320. The information message 225 may be represented by a Beacon frame. The information message 225 may be represented by a Probe Response frame.

The present invention will now be described in detail with reference to FIGS. 6. To perform the method steps 410-430 in the wireless endpoint device 140, 142, 144, the wireless endpoint device 140, 142, 144 comprises a number of arrangements depicted in FIG. 6. The wireless endpoint device 140, 142, 144 is located within coverage of one or more wireless local area networks 100, 105. The one or more wireless local area networks 100, 105 comprise a respective access point 110, 115.

The wireless endpoint device 140, 142, 144 comprises a receiving unit 610 adapted to receive one or more information messages 225 from the respective one or more access points 110, 115. The said information messages 22) each comprise an access point information 205 indicating whether the respective wireless local area network 100, 105 is intended for public use or private use.

The wireless endpoint device 140, 142, 144 may further comprise a wireless connection unit 620 adapted to select one or none of the one or more wireless local area networks 100, 105 to connect to based on the received access point information 205.

The wireless endpoint device 140, 142, 144 may also comprise a sending unit 630 adapted to send a request message 215 to each of the one or more access points 110, 115. Each of the request messages 215 comprising a request for wireless network information.

According to some embodiments the wireless endpoint device 140, 142, 144 may be a mobile phone, a laptop or a PDA.

Figure 7:
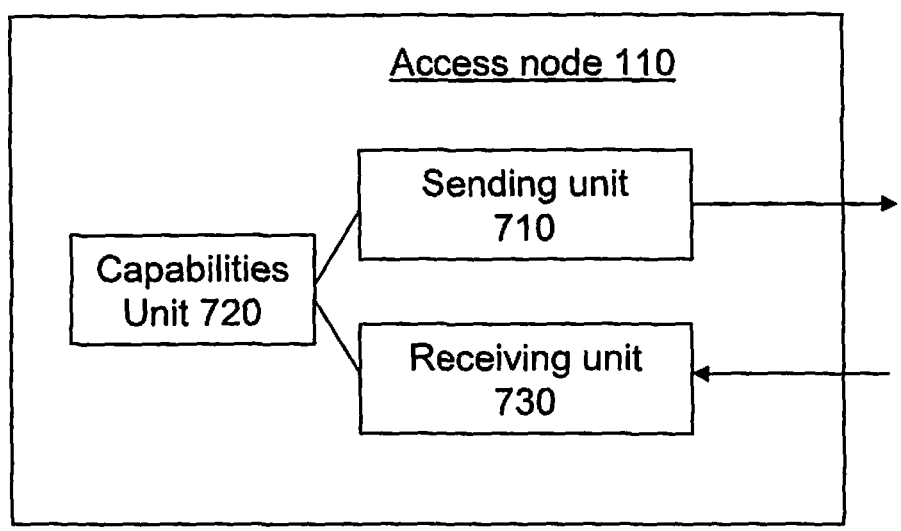
FIG. 7 is a block diagram illustrating an embodiment of a wireless endpoint device.

The present invention will now be described in detail with reference to FIG. 7. To perform the method steps 510-540 in the access point 110, the access point 110 comprises a number of arrangements as depicted in FIG. 7. The access point 110 is capable of providing network access information to a wireless endpoint device 140, 142, 144. The wireless endpoint device 140, 142, 144 is located within the coverage of a wireless local area network 100. The wireless local area network 100 comprises the access point 110.

The access point 110 comprises a sending unit 710 adapted to send an information message 225 to the wireless endpoint device 140, 142, 144. The information message 225 comprises an access point information 205. The access point information 205 indicates whether the wireless local area network 100 is intended for public use or private use. The sending unit 710 may further be adapted to obtain the stored access point information 205 from the capabilities unit 720 prior to sending the information message 225.

The access point 110 may further comprise a capabilities unit 720 adapted to configure and store the access point information 205.

The access point 110 may also comprise a receiving unit 730 adapted to receive a request message 215 from the wireless endpoint device 140, 142, 144. The request message 215 may comprise a request for wireless network information.

The present methods and arrangements for indicating the intended use of a wireless network can be implemented through one or more processors together with computer program code for performing the functions of the invention. The program code mentioned above may also be provided as a computer program product, for instance in the form of a data carrier carrying computer program code for performing the present method when being loaded into the access point 110 and wireless endpoint device 140, 142, 144 of the wireless network 100. One such carrier may be in the form of a CD ROM disc. It is however feasible with other data carriers such as a memory stick. The computer program code can furthermore be provided as pure program code on a server and downloaded to the access point 110 and wireless endpoint device 140, 142, 144 remotely.

When using the word "comprise" or "comprising" it shall be interpreted as non-limiting, in the meaning of "consist at least of"

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A method in an access point for providing network access information to a wireless endpoint device located within the coverage of an unprotected private home wireless local area network, the unprotected private home wireless local area network comprising the access point, the method comprising:
   sending an information message to the wireless endpoint device, wherein the information message comprises an access point information indicating that the unprotected private home wireless local area network is intended for private use by members of the unprotected private home wireless local area network; and
   refraining from connecting the wireless endpoint device to the unprotected private home wireless local area network in response to the access point indicating that the unprotected private home wireless local area network is intended for private use by members of the unprotected private home wireless local area network, even though the wireless endpoint device is capable of connecting to the unprotected private home wireless local area network.

2. A method according to claim 1, further comprising:
   configuring and storing the access point information in a capabilities unit comprised in the access point; or
   obtaining said stored access point information from the capabilities unit prior to the sending the information message.

3. A method according to claim 1, wherein the information message comprises a Beacon frame.

4. A method according to claim 1 wherein the sending is preceded by:
   receiving a request message from the wireless endpoint device, the request message comprising a request for wireless network information.

5. A method according to claim 1, wherein the access point information is included in a frame body of the information message.

6. A method according to claim 5, wherein the access point information comprises an extra field in the frame body.

7. A computer program product for operating an access point, the computer program product comprising a non-transitory computer-readable medium having computer-readable program code executable by the access point, the computer-readable program code being configured to cause the access point to perform the method of claim 1.

8. A method according to claim 1, further comprising:
   setting the access point information to default to an indication that the unprotected private home wireless local area network is private, wherein the access point information maintains the indication until a command is received to switch the indication from private to public.

9. A method according to claim 1, further comprising:
   interrupting a procedure to access the unprotected private home wireless local area network in response to the access point indicating that the unprotected private home wireless local area network is intended for private use by members of the unprotected private home wireless local area network.

10. An access point that is configured to provide network access information to a wireless endpoint device located within the coverage of an unprotected private home wireless local area network, the unprotected private home wireless local area network comprising the access point, the access point comprising:
    a processor; and
    a memory coupled to the processor and comprising computer readable program code embodied in the memory that when executed by the processor causes the processor to perform operations comprising;
    sending an information message to the wireless endpoint device wherein the information message comprises an access point information indicating that the unprotected private home wireless local area network is intended for private use by members of the unprotected private home wireless local area network,
    wherein the wireless endpoint device refrains from connecting to the unprotected private home wireless local area network in response to the access point indicating that the unprotected private home wireless local area network is intended for private use by members of the unprotected private home wireless local area network, even though the wireless endpoint device is capable of connecting to the unprotected private home wireless local area network.

11. An access point according to claim 10,
wherein the operations further comprise:
configuring and storing the access point information; and
obtaining the stored access point information prior to sending the information message.

12. An access point according to claim 10,
wherein the operations further comprise receiving a request message from the wireless endpoint device, the request message comprising a request for wireless network information.

13. A method in a wireless endpoint device for being provided with network access information, the wireless endpoint device being located within coverage of one or more unprotected private home wireless local area networks, the one or more unprotected private home wireless local area networks comprising a respective access point, the method comprising:
receiving one or more information messages from a respective one or more of the access points, wherein a respective information message comprises an access point information indicating that the respective unprotected private home wireless local area network is intended for private use by members of the unprotected private home wireless local area network;
and refraining from connecting the wireless endpoint device to the unprotected private home wireless local area network in response to the access point indicating that the unprotected private home wireless local area network is intended for private use by members of the unprotected private home wireless local area network, even though the wireless endpoint device is capable of connecting to the unprotected private home wireless local area network.

14. A method according to claim 13, wherein the receiving is preceded by:
sending request message to a respective one or more of the access points, a respective request message comprising a request for the wireless network information.

15. A method according to claim 13, further comprising:
selecting one or none of the one or more unprotected private home wireless local area networks to connect to based on whether the received access point information indicates that the unprotected private home wireless local area network is public or private.

16. A computer program product for operating a wireless endpoint device, the computer program product comprising a non-transitory computer-readable medium having computer-readable program code executable by the wireless end point device, the computer-readable program code being configured to cause the wireless endpoint device to perform the method of claim 13.

17. A wireless endpoint device being located within coverage of one or more unprotected private home wireless local area networks, the one or more unprotected private home wireless local area networks comprising a respective access point, the wireless endpoint device comprising:
a processor: and
a memory coupled to the processor and comprising computer readable program code embodied in the memory that when executed by the processor causes the processor to perform operations comprising:
receiving one or more information messages from the respective one or more access points wherein a respective information message comprises an access point information indicating that the respective unprotected private home wireless local area network is intended for private use by members of the unprotected private home wireless local area network; and
refraining from connecting the wireless endpoint device to the unprotected private home wireless local area network in response to the access point indicating that the unprotected private home wireless local area network is intended for private use by members of the unprotected private home wireless local area network, even though the wireless endpoint device is capable of connecting to the unprotected private home wireless local area network.

18. A wireless endpoint device according to claim 17,
wherein the operations further comprise sending a request message to a respective one or more of the access points, a respective request message comprising a request for wireless network information.

19. A wireless endpoint device according to claim 17,
wherein the operations further comprise selecting one or none of the one or more unprotected private home wireless local area networks to connect to based on whether the received access point information indicates that the unprotected private home wireless local area network is public or private.

20. A wireless endpoint device according to claim 17, wherein the wireless endpoint device is a mobile phone, a laptop computer or a PDA (Personal Digital Assistant).

* * * * *

UNITED STATES PATENT AND TRADEMARK OFFICE
CERTIFICATE OF CORRECTION

PATENT NO. : 8,879,525 B2
APPLICATION NO. : 13/139488
DATED : November 4, 2014
INVENTOR(S) : Ahlback et al.

It is certified that error appears in the above-identified patent and that said Letters Patent is hereby corrected as shown below:

On the Title Page, in Item (87), under "PCT Pub. No.", in Column 1, Line 1, delete "WO2008/134281" and insert -- WO2010/082873 --, therefor.

On the Title Page, in Item (87), under "PCT Pub. Date", in Column 1, Line 1, delete "Nov. 6, 2008" and insert -- Jul. 22, 2010 --, therefor On the Title Page, in Item (57), under "ABSTRACT", in Column 2, Lines 1-15, delete "A method and a wireless transmit/receive unit (WTRU) (600), including a universal subscriber identity module USIM (625), for identifying a closed subscriber group (CSG) cell are disclosed. The WTRU (600) receives a broadcast from a cell including a cell identifier (ID). If the cell ID is associated with a CSG cell, the WTRU (600) determines whether the CSG ID is programmed in the USIM (625). The cell broadcast may include a single bit information element (IE) indicating that the cell is a CSG cell. If the cell ID is a CSG ID, the cell ID may further include a plurality of fields which indicate at least one of a country, a region, an operator, and a home evolved Node-B (HeNB) number. The cell broadcast may further include a bit indicating whether the CSG cell is public or private. The cell broadcast may further include a bit indicating that emergency calls are allowed from all users." and insert -- An object of the present invention is to provide a mechanism for improved access signalling in a wireless local area network. The object is achieved by a method in an access point 110 for providing network access information to a wireless endpoint device 140, 142, 144. The wireless endpoint device 140, 142, 144 is located within the coverage of a wireless local area network 100. The wireless local area network 100 comprises the access point 110. The method is characterized by the step of sending 220, 540 an information message 225 to the wireless endpoint device 140, 142, 144. The information message 225 comprises an access point information 205 indicating whether the wireless local area network 100 is intended for public use or private use. --, therefor.

In The Specification

In Column 1, Line 57, delete "and or" and insert -- and/or --, therefor.

Signed and Sealed this
Twenty-third Day of June, 2015

Michelle K. Lee
*Director of the United States Patent and Trademark Office*

CERTIFICATE OF CORRECTION (continued)
U.S. Pat. No. 8,879,525 B2

In Column 2, Line 40, delete "established!" and insert -- established. --, therefor.

In Column 3, Line 56, delete "frame" and insert -- frame. --, therefor.

In Column 5, Line 31, delete "network 100, 100," and insert -- network 100, 105, --, therefor.

In Column 7, Line 2, delete "messages" and insert -- message --, therefor.

In Column 7, Line 9, delete "message 210," and insert -- message 225, --, therefor.

In Column 8, Line 20, delete "device 100." and insert -- device. --, therefor.

Figure 6:
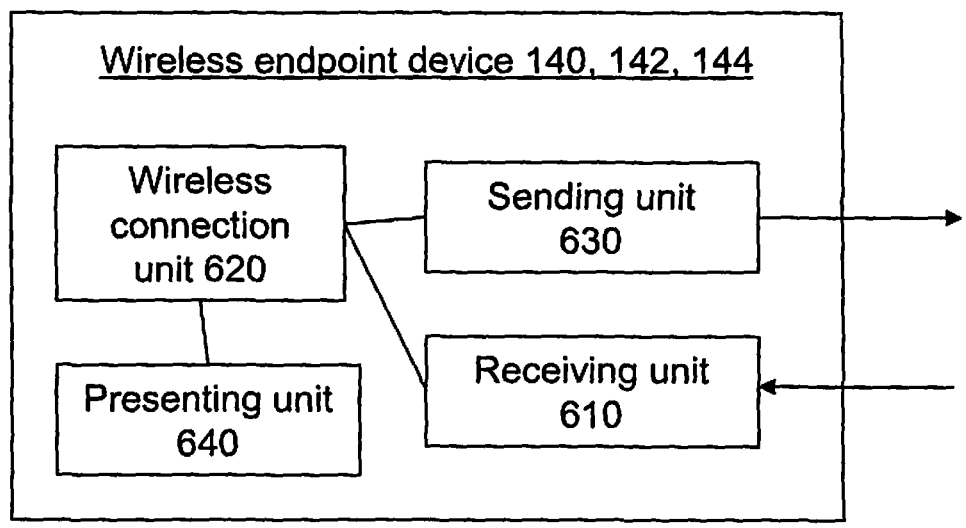
FIG. 6 is a block diagram illustrating an embodiment of an access point.

In Column 8, Line 46, delete "FIGS. 6." and insert -- FIG. 6. --, therefor.

In Column 9, Line 49, delete "of"" and insert -- of". --, therefor.

In The Claims

In Column 10, Line 14, in Claim 2, delete "to the sending" and insert -- to sending --, therefor.

In Column 10, Line 18, in Claim 4, delete "claim 1" and insert -- claim 1, --, therefor.

In Column 10, Line 57, in Claim 10, delete "comprising;" and insert -- comprising: --, therefor.

In Column 11, Line 41, in Claim 14, delete "sending" and insert -- sending a --, therefor.

In Column 12, Line 12, in Claim 17, delete "processor:" and insert -- processor; --, therefor.